Feb. 13, 1968     H. WING     3,368,248
MEANS FOR DETACHABLY CONNECTING STRUCTURAL ELEMENTS
Filed June 2, 1965     5 Sheets-Sheet 1
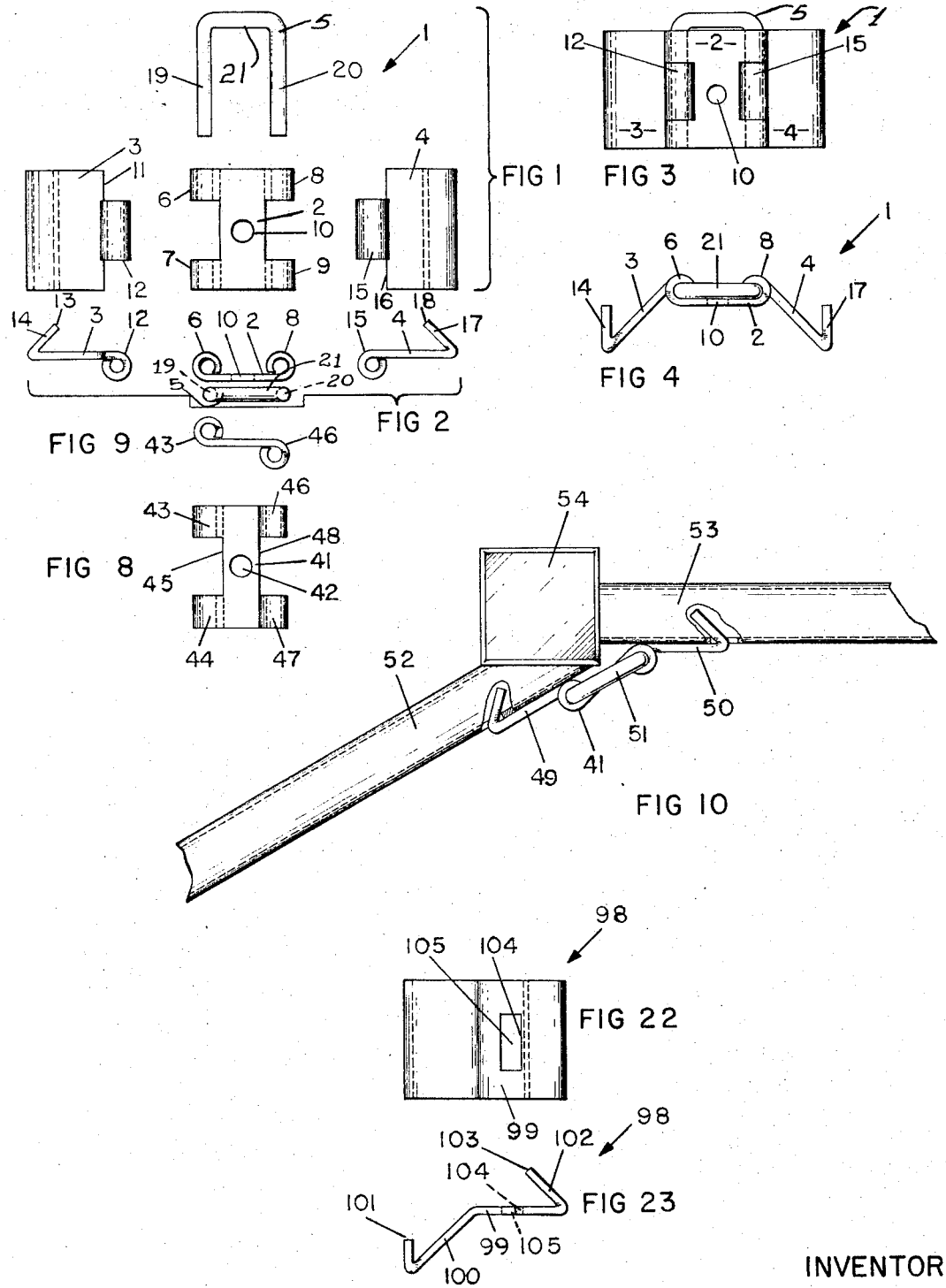
INVENTOR,
HOWARD WING
ATTORNEYS Feb. 13, 1968   H. WING   3,368,248
MEANS FOR DETACHABLY CONNECTING STRUCTURAL ELEMENTS
Filed June 2, 1965   5 Sheets-Sheet 2
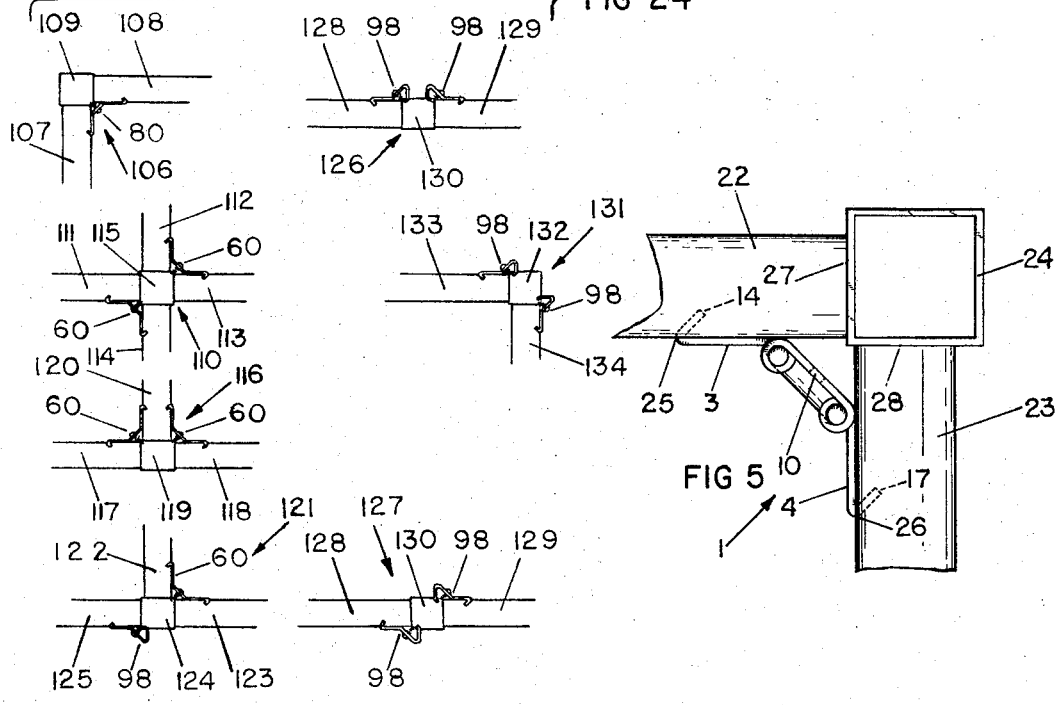
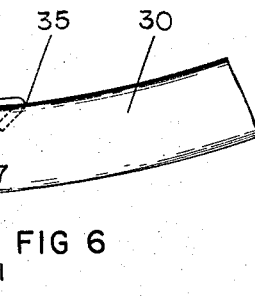
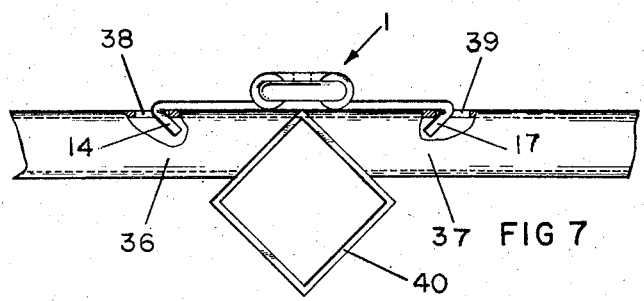
INVENTOR,
HOWARD WING
ATTORNEYS Feb. 13, 1968     H. WING     3,368,248
MEANS FOR DETACHABLY CONNECTING STRUCTURAL ELEMENTS
Filed June 2, 1965     5 Sheets-Sheet 3

INVENTOR,
HOWARD WING
ATTORNEYS

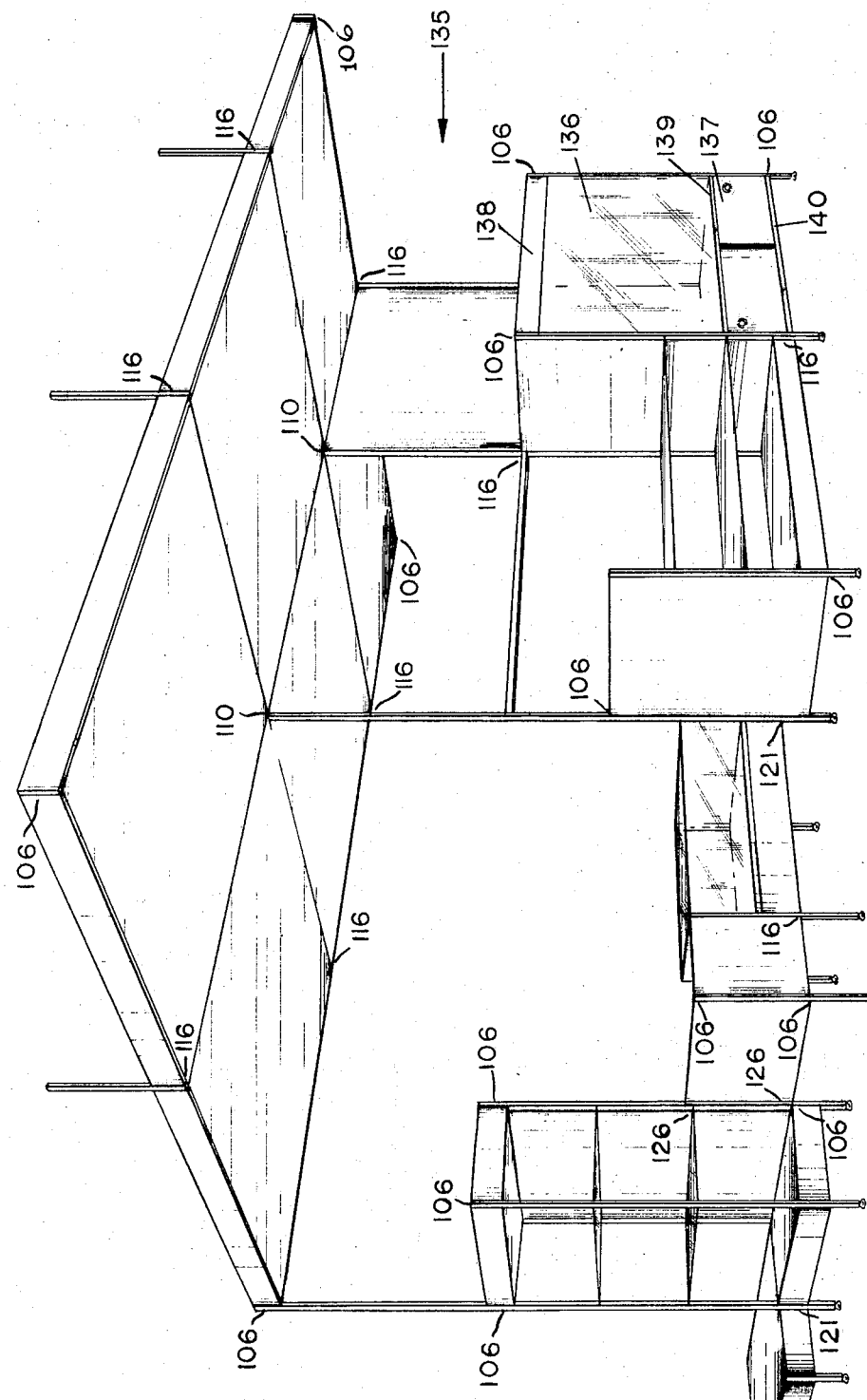

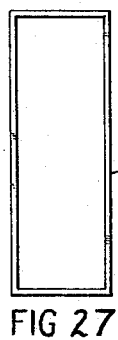
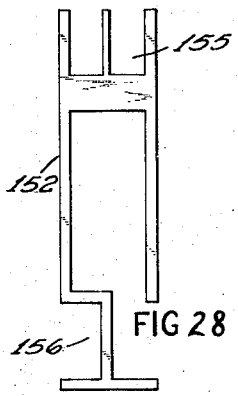
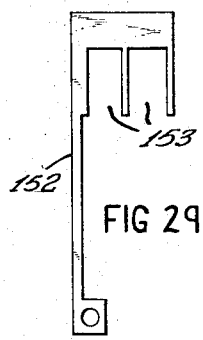
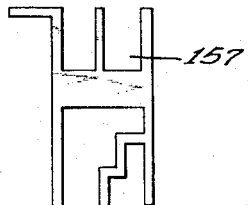
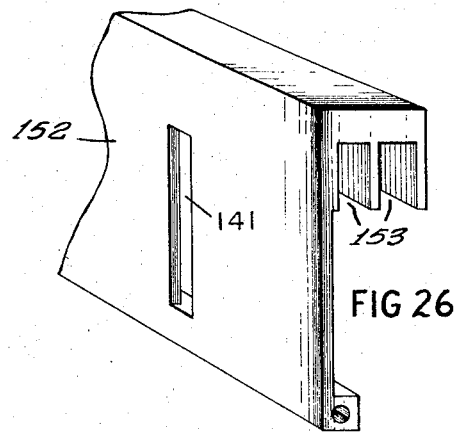
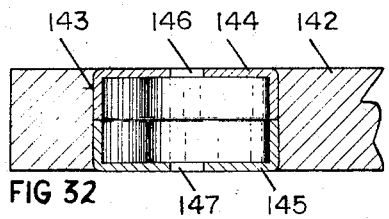
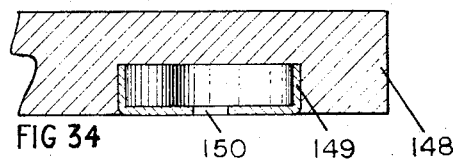
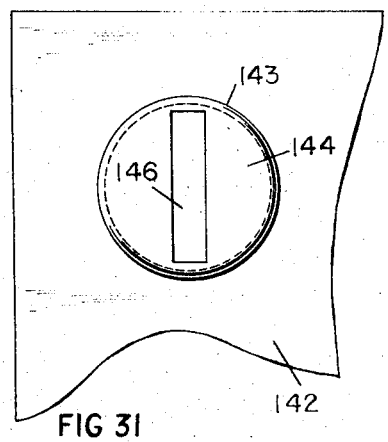
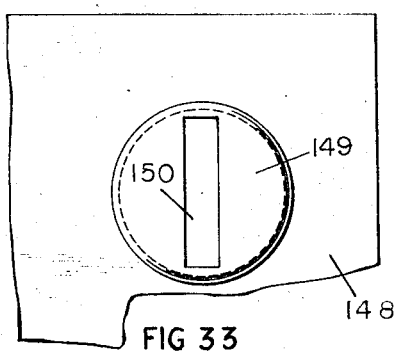

United States Patent Office 3,368,248
Patented Feb. 13, 1968

3,368,248
MEANS FOR DETACHABLY CONNECTING
STRUCTURAL ELEMENTS
Howard Wing, 246 Breadner Crescent,
Chippawa, Ontario, Canada
Filed June 2, 1965, Ser. No. 460,781
2 Claims. (Cl. 24—73)

ABSTRACT OF THE DISCLOSURE

A centre piece having a screw hole therethrough in its longitudinal centre has an arm hingedly connected at each of its ends adapted to lie in surface contact with a member which is to be drawn into rigid contact with a supporting member, each arm having a hook end adapted to engage in said member at an angle to be drawn into aligned engagement with the supporting member by a screw passing through said hole into threaded engagement with said supporting member.

The invention relates to means for detachably connecting hollow structural elements, such as articles of furniture and the like composed of tubular or solid framework.

In like purpose devices of the prior art, the corner clamps, or connections, are generally restricted for use with solid materials, such as wooden rungs of chairs and the like, wherein a certain amount of material is cut away to provide a base portion for the clamp. This has the disadvantage of weakening the structure as a whole, and furthermore it requires several additional steps in the manufacture of the components.

Another major disadvantage of these prior devices is that in general they provide only for the joining of the various components at right angles and are not easily adapted for joining the components at any other angle.

Other clamping devices also have a disadvantage in that their attachment screws must extend out from the upright corner post to which they are attached and pass through the body of the clamp. Thus, if the corner connection is forming part of a support structure in which a weight is applied to the top of the clamping device there will be a bending stress applied to the bolt which could result in the collapse of the clamp.

It is an object of the instant invention, therefore, to provide a clamping device which is equally adaptable for use with tubular material as with solid material.

Another object of the invention is to provide a clamping device which may be attached to a corner post direct without the latter requiring to be cut away to any great extent, the only holes being either a female threaded hole to accommodate the attachment screw, or a slot in the case of the quick release type of attachment to be described hereinafter.

A further object is to provide a clamping device which may be utilized to join side members at any desired angle to the upright.

Another object of the invention is the provision of an embodiment which permits the joining of only one side member to a corner upright.

Still another object of the invention is to provide a clamping device which, in at least one embodiment, is closely attached to the corner post so that any weight applied to the bracket will present a shear stress on the bolt only, and therefore eliminate any bending stress, thus making my device much stronger than those of the prior art.

Still another object of the instant invention is to provide a clamping device which is readily adaptable for use with any one of a number of attaching devices, and in particular screw types and quick-release clip types.

With the above and other objects in view the invention consists in the novel features of construction and combination of parts described and shown herein and more particularly pointed out in the claims for novelty following.

In describing the invention reference will be made to the accompanying drawings, in which:

FIGURE 1 is an exploded side view of the components forming one embodiment of the invention.

FIGURE 2 is an exploded plan view of the components of FIGURE 1.

FIGURE 3 is a side view of the clamping device of FIGURE 1, shown in its assembled condition.

FIGURE 4 is a plan view of the device of FIGURE 3.

FIGURE 5 is a plan view of the device of FIGURE 3, shown in position upon being utilized to secure two side members to a corner post at right angles to each other.

FIGURE 6 is a plan view of the device of FIGURE 3, shown in position upon being utilized to secure two arcuate members in alignment to a corner post.

FIGURE 7 is a plan view of the device of FIGURE 3, shown in position upon being utilized to secure two straight members in axial alignment to a corner post.

FIGURE 8 is a side view of an alternative centre plate to that of the embodiment of FIGURE 1.

FIGURE 9 is a plan view of the centre plate of FIGURE 8.

FIGURE 10 is a plan view of another embodiment of the clamping device, in which the centre plate of FIGURE 6 is utilized to permit the device to secure two side members to a corner post, one of the side members being at right angles to the post and the other being at an obtuse angle to the post.

FIGURE 22 is a side view of another one-piece embodiment of the invention adapted to secure only one side member to a corner post.

FIGURE 23 is a plan view of the device of FIGURE 22.

FIGURE 24 is a series of diagrammatic sketches, in plan view, illustrating various applications of the single and double types of the one-piece clamps of the invention.

FIGURE 25 is a perspective view of a display stand, the erection of which utilizes clamping devices of the instant invention.

FIGURE 26 is a perspective view of the support rail shown in FIGURE 29 and showing the slot, receiving the arms of the clamp.

FIGURES 27, 28, 29 and 30 are end views of various types of extruded support rails which may be adapted for use with the present invention.

FIGURE 31 is a fractional plan view of a solid beam containing an adapter on each side for use with the present invention.

FIGURE 32 is a sectional side elevation of the beam of FIGURE 31.

FIGURE 33 is a fractional plan view of a solid beam embodying a single adapter.

FIGURE 34 is a sectional side elevation of the beam of FIGURE 33.

Like numerals of reference indicate corresponding parts in the various figures.

Figure 14:
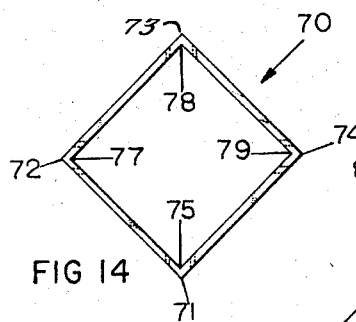
FIGURE 14 is a plan view of the corner post of FIGURE 13.

Referring first to FIGURES 1, 2, 3 and 4, a clamping device 1 comprises a centre piece 2, a pair of arms 3 and 4 and a U-shaped hinge pin 5. The centre piece 2 is rectangular and is of flat plate material and supports a pair of spaced apart tubular extensions 6 and 7 on the one side and a similar pair of spaced apart tubular extensions 8 and 9 on the opposite side. A circular hole 10 is formed substantially through the centre of the centre piece 2 to accommodate an attachment screw (not shown).

The arm 3 is formed from the same material as the centre piece and is also rectangular, its innermost edge 11 supporting a centrally located tubular extension 12 and its outermost edge 13 being bent in a line parallel with it to form a hook 14 at an acute angle with the arm 3. The tubular extension 12 is of the same diameter as the sections 6 and 7 and is adapted for freely fitting between said sections in axial alignment therewith.

The arm is a mirror image of the arm 3, having a tubular extension 15 on the one edge 16 and being bent to form a hook 17 at the opposite edge 18. The extension 15 is adapted to fit freely between the extensions 8 and 9 of the centre piece 2 and in axial alignment therewith. The hinge pin 5 is of round bar material having a pair of spaced apart, parallel legs 19 and 20 joined by an integral cross bar 21. The spacing of the legs 19 and 20 is such that the leg 19 may pass freely through the extensions 6, 12 and 7, while the leg 20 may pass freely through the extensions 8, 15 and 9 to join the arms 3 and 4 to the centre piece 2 in the manner of hinged plates.

In FIGURE 5 the device 1 is illustrated in use, holding a pair of side members 22 and 23 onto a corner post 24. In this assembly, the side members 22 and 23 are each slotted to receive the hooks 14 and 17 of the arms 3 and 4 respectively. The positioning of the slots 25 and 26 in the side members 22 and 23 respectively is such that upon the ends 27 and 28 of the members 22 and 23 abutting against the corner post 24 the arms 3 and 4 rest on the inner surfaces of the members 22 and 23 respectively. Although not illustrated, it will be evident that a screw passing through the hole 10 to enter the corner post 24 will serve to securely attach the device 1 and, therefore, side members 22 and 23 to the corner post 24.

Referring to FIGURE 6 it will be obvious how the device 1 is adapted to interconnect two arcuate side members 29 and 30 and at the same time secure them to a corner post 31.

The ends 32 and 33 of the side members 29 and 30 are each formed at an angle to permit them to butt against adjacent sides of the rectangular corner post 31 while preserving the overall contour of the arcuate conformation. In this case, the side members 29 and 30 are slotted at 34 and 35 to closely receive the hooks 14 and 17, and their respective plates 3 and 4 are in alignment while substantially fitting flush against the inner walls of the side members. A screw (not shown) may thereafter be utilized to secure the device 1 to the corner post 31 to maintain the side members in their desired position.

FIGURE 7 illustrates a similar arrangement to that of FIGURE 6, the side members 36 and 37 being straight and slotted at 38 and 39 respectively, in order to receive the hooks 14 and 17, enabling the device 1 to interconnect them and attach them to a corner post 40.

FIGURES 8 and 9 illustrate an alternative to the centre piece 2 of FIGURE 1. In this instance a centre piece 41, suitably perforated through the centre at 42 to accommodate attaching screw, is adapted to support a pair of spaced apart tubular extensions 43 and 44 on the one edge 45, these extensions being biased to the front of the centre piece while alternatively, a second pair of tubular extensions 46 and 47 at the edge 48 are biased to the rear of the centre piece. Thus, as illustrated particularly in FIGURE 10, upon a pair of arms 49 and 50, similar in all respects to the arms 3 and 4 of FIGURE 1, being hingedly attached to the centre piece 41 by a hinge pin assembly 51, they will at all times be offset one from the other. This is particularly useful when it is required to connect two side members, as shown at 52 and 53, to a corner post 54, when the side member 52 is required to extend diagonally away from the corner post while the side member 53 extends at right angles to the post. In this case, the amount of offset between the arms 49 and 50 is sufficient to permit them to lie flush against their respective side members 52 and 53 to provide a secure joint. Again, the attaching screw or other means is not illustrated, for the sake of clarity.

Figure 12:
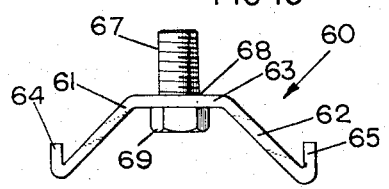
FIGURE 12 is a plan view of the device of FIGURE 11, showing the screw in position.
Figure 11:
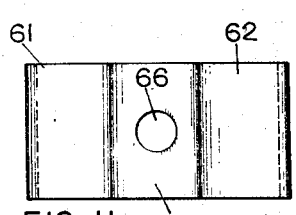
FIGURE 11 is a side view of another embodiment of the invention in which the clamping device is in one piece and a hole is formed in the centre plate to accommodate a fastening screw.

Referring to FIGURES 11 and 12, a one-piece clamping device 60 is illustrated in which the arms 61 and 62 are integral with the centre piece 63, the whole device being fabricated from heavy gauge sheet material such as steel, aluminum, high impact plastic or the like. The arms 61 and 62 support hook members 64 and 65 respectively. A hole 66 is formed through the centre piece 63 to permit the shank 67 of a screw 68 to pass freely through it, the head 69 of the screw being adapted to rest on the centre piece.

Figure 13:
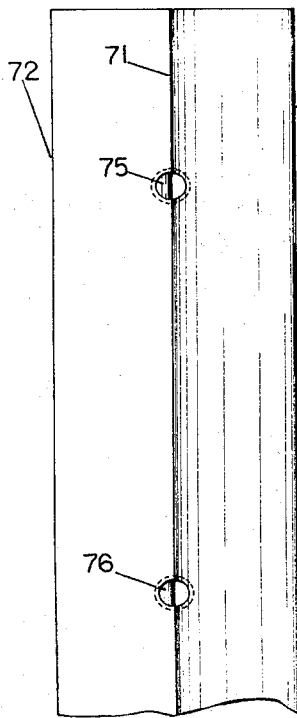
FIGURE 13 is a side view of a corner post suitably drilled and threaded to receive the screw of FIGURE 12.

FIGURES 13 and 14 illustrate a corner post 70 to which the device 60 may be attached by means of the screw 68. In this instance, the corner post 70 is of square tubular section, the four corner edges 71, 72, 73 and 74 being suitably drilled and threaded, as shown at 75 and 76 of FIGURE 13 and at 75, 77, 78 and 79 in FIGURE 14, to receive the threaded shank 67 of the screw 68. Thus a plurality of clamping devices 60 may be attached to a corner post 70 to allow a corresponding number of side members to be attached thereto for the support of spaced apart shelves and the like.

Figure 18:
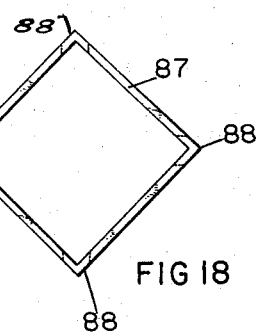
FIGURE 18 is a plan view of the corner part of FIGURE 17.
Figure 17:
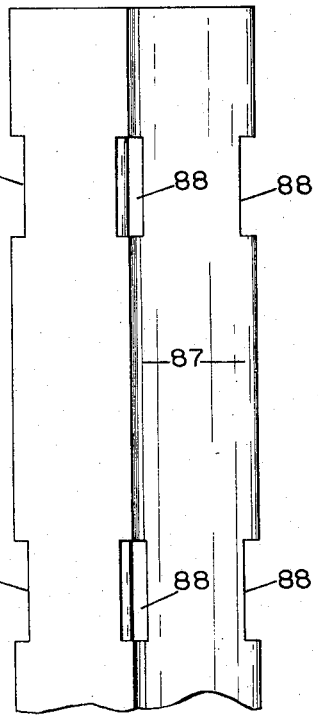
FIGURE 17 is a side view of a corner post suitably slotted to receive the quick-release clip of FIGURE 16.
Figure 16:
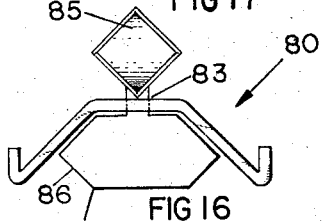
FIGURE 16 is a plan view of the device of FIGURE 15, showing the quick-release clip in position.
Figure 15:
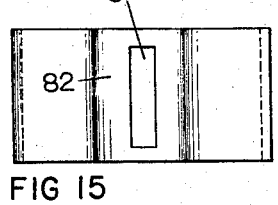
FIGURE 15 is a side view of an alternative to the one-piece device of FIGURE 11, in which a slot is formed in the centre plate to accommodate a quick-release clip.

Referring to FIGURES 15 and 16, a clamping device 80 is shown which is basically identical to the clamping device 60 of FIGURE 11, with the exception of a longitudinal slot 81 which is formed in the centre piece 82 thereof to accommodate the shank 83 of a quick-release clip 84. The clip 84 is also fabricated from heavy gauge sheet material and comprises a rectangular inner member 85 attached by the shank 83 to an outer tab 86. The tab 86 is shaped to conform to the inner contour of the clamp 80 when horizontal, at which location the inner member 85 is also adapted to conform to the inner contour of a square tube. An example of the square tube is illustrated in FIGURES 17 and 18 at 87, a plurality of slots 88 being formed in each of the four edges of the tube, which acts as a corner post to again support a number of clamps 80, which, in turn permits a corresponding number of side members to be fitted.

Figure 21:
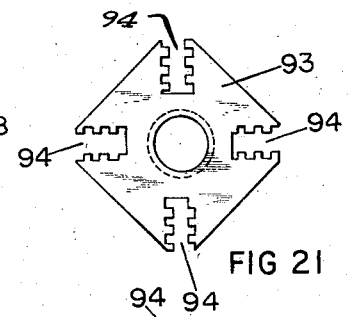
FIGURE 21 is a plan view of the corner post of FIGURE 20.
Figure 20:
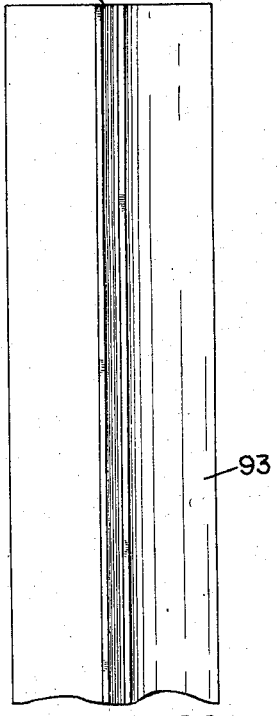
FIGURE 20 is a side view of a corner post in which the corners are suitably indented over at least part of their length to slidably receive the threaded portion of the screw of FIGURE 19.
Figure 19:
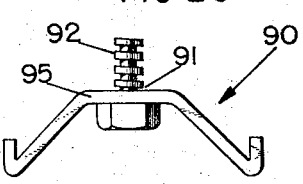
FIGURE 19 is a plan view of the device of FIGURE 11, in which a screw having a deep, coarse, square thread is shown in position.

In FIGURE 19 another clamping device 90 is illustrated, its attaching screw 91 having a very coarse square threaded shank 92. This device 90 is adapted for use with a solid corner post 93 as shown in FIGURES 20 and 21. The corners of the post 93 are slotted for at least some of their length, each slot 94 extending to the top of the post and being in plan view vertical to the section of the shank 92 of the screw 91. With this device, the screw 91 is always fully home against the centre piece 95 of the clamp 90, and to be fitted to the post 93 it is merely necessary to slide the shank 92 into the required slot 94. Upon reaching the desired position on the corner post 93, a slight turn of the screw 91 is sufficient to lock it into place, the contour of the walls of the slot 94 acting as female screw threads.

Referring now to FIGURES 22 and 23, a modified one-piece clamp 98 is illustrated in which a slotted centre piece 99 supports one arm 100 having a hooked end 101 similar to the arms of the previously described devices. The other arm 102, however, is bent substantially centrally so that its outer edge 103 lies perpendicularly over the nearest edge 104 of the slot 105. Thus, upon being fitted to a square corner post, the arm 100 will perform its usual function in supporting a side member while the edge 104 of the arm 102 is adapted to contact the side of the corner post to provide a solid support for the clamp.

The diagrammatic sketches in FIGURE 24 illustrate various applications of the one-piece device herein described. At 106 two side members 108 and 107 are secured to a corner post 109 at right angles to each other by means of a clamping device 80. At 110 four side members 111, 112, 113 and 114 converge on a corner post 115 and are retained there at 90° spacing by a pair of oppositely located clamps 60. At 116, two side members 117 and 118 are held in axial alignment at a corner post 119, while a third side member 120 extends outwardly therefrom at right angles. This involves the use of two clamps 60, each attached to one side of the side member 120, while also supporting the side members 117 and 118.

At 121, the same arrangement of side members as at 116 is illustrated but they are now supported by a clamp 60 and a clamp 98. The clamp 60 attaches two side members 122 and 123 to a corner post 124, while diametrically opposite to the clamp 60 a clamp 98 attaches a third side member 125 to the corner post 124 in axial alignment with the member 123.

Arrows 126 and 127 illustrate two methods of utilizing two clamps 98 to attach a pair of side members 128 and 129 in axial alignment to a corner post 130. In diagram 126 the clamps 98 are located on adjacent corners of the post 130 while in diagram 127 they are diagonally opposed.

In diagram 131, a pair of clamps 98 are attached to diagonally opposed corners of the corner post 132 and are adapted to retain a pair of side members 133 and 134 at right angles to each other.

The structure 135 of FIGURE 25 illustrates the versatility of construction made possible by utilizing clamps of the present invention and it will be noted that in the structure 135 it is possible to incorporate windows 136 and sliding doors 137, each of which are retained in a channelled framework 138, 139 and 140.

FIGURES 26, 27, 28, 29 and 30 illustrate various types of this framework, all of which may be slotted as shown at 141 in FIGURE 26 for association with a clamping device 1, 60, 80, 90 or 98 which may then be utilized to attach one or more of these frames to a corner post in the same manner as described for the side members.

While each of the structures of FIGURES 26, 27, 28, 29 and 30 comprises a supporting body in which a slot 141 is used to receive a suitable member for connecting the structure to a corner post, these supporting bodies may be otherwise appropriately formed for a particular adaptation, for instance, in FIGURES 26 and 29 the structure is formed to provide parallel grooves 153 to receive windows, doors, or the like. The structure of FIGURE 27 is simply a rectangular frame 154 for any appropriate purpose. The structure 152 of FIGURE 28 is shown as having a part provided with grooves 155 for doors, windows, or other devices, and, further, having an offset flanged part 156 which may constitute a support for a grid or other device. The device of FIGURE 30 is shown as formed to provide grooves 157 and a frame 158 for sliding doors, windows or other devices.

In applications where solid material is utilized for support frames and the like, as shown at 142 in FIGURES 31 and 32, a hole 143 may be formed through the frame and a pair of flanged discs 144 and 145 inserted therein in an interference fit. Each of these discs has a slot, the slots 146 and 147, respectively, formed therein to accommodate the hooked portions of any of the foregoing clamping devices.

Similarly, in FIGURES 33 and 34 a solid frame 148 requiring support at only one side is suitably bored to receive a flanged disc 149 in an interference fit, the disc having a slot 150 formed therein to again receive the hooked portion of any of the aforementioned clamping devices.

While I have shown herein and described the present preferred form of construction and arrangement of parts and certain modifications thereof for carrying out my said invention, these are capable of variation and modification. I, therefore, do not wish to be limited to the precise details of construction and arrangements set forth, but desire to avail myself of such variations and modifications as come within the scope of the appended claims.

What I claim is:

1. In a clamping device, a flat rectangular centre piece, said centre piece having a spaced apart first pair of tubular extensions in axial alignment at a first edge, and a second pair of spaced apart, axially aligned tubular extensions at a second edge on the opposite side of said centre piece to said first edge, the axis of said first and second extensions being in a common plane parallel to the surface of said centre piece, a first said arm having a centrally located first tubular extension supported at an innermost edge thereof, an outermost edge of said first arm being bent forwardly and inwardly to form a first hook, said first tubular extension being freely insertible between said first pair of tubular extensions and axially alignable therewith, first hinge pin means passing through said first tubular extensions, a second said arm having a centrally located second tubular extension supported at an innermost edge thereof, an outermost edge of said second arm being bent forwardly and inwardly to form a second hook, said second tubular extension being freely insertable between said second pair of tubular extensions and axially aligned therewith, second hinge pin means passing through all said second tubular extensions and said centre piece being apertured substantially centrally to freely accommodate the shank of a locking screw.

2. A clamping device according to claim 1, in which said first and said second hooks extend inwardly in parallel with said locking screw.

References Cited

UNITED STATES PATENTS

| 1,676,272 | 7/1928 | McEwen | 287—189.36 |
| 1,907,720 | 5/1933 | Bolin | 287—20.92 |
| 2,057,942 | 10/1936 | Fay | 287—187.36 |

FOREIGN PATENTS

| 1,235,433 | 5/1960 | France. |
| 59,981 | 12/1925 | Sweden. |
| 250,866 | 7/1948 | Switzerland. |

OTHELL M. SIMPSON, *Primary Examiner.*

WILLIAM FELDMAN, *Examiner.*

E. SIMONSEN, *Assistant Examiner.*